(12) United States Patent
Connor et al.

(10) Patent No.: US 7,796,532 B2
(45) Date of Patent: Sep. 14, 2010

(54) MEDIA SEGMENT MONITORING

(75) Inventors: Kevin Joseph Connor, Blaine, WA (US); Mohammed Taher Shaikh, Fremont, CA (US); Ilya Umansky, San Jose, CA (US); Radhika Padmanabhan, Saratoga, CA (US); Xiaode Xu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1043 days.

(21) Appl. No.: 11/444,652

(22) Filed: May 31, 2006

(65) Prior Publication Data

US 2007/0280127 A1    Dec. 6, 2007

(51) Int. Cl.
*H04L 12/26* (2006.01)
(52) U.S. Cl. ..................... 370/252; 370/392
(58) Field of Classification Search .......... 370/252, 370/253, 242, 244, 245, 389, 392, 352, 353, 370/354, 356, 400, 401, 428, 235; 709/231, 709/232, 233, 234
See application file for complete search history.

(56) References Cited

U.S. PATENT DOCUMENTS

| | | | |
|---|---|---|---|
| 7,023,839 B1 * | 4/2006 | Shaffer et al. | 370/356 |
| 7,299,277 B1 * | 11/2007 | Moran et al. | 709/224 |
| 7,467,198 B2 * | 12/2008 | Goodman et al. | 709/223 |
| 2003/0007458 A1 | 1/2003 | Procopio | |
| 2003/0165119 A1 | 9/2003 | Hsu et al. | |
| 2004/0066742 A1 * | 4/2004 | Varsa et al. | 370/229 |
| 2004/0066753 A1 | 4/2004 | Grovenburg | |
| 2004/0071129 A1 | 4/2004 | Doerr et al. | |
| 2004/0165527 A1 * | 8/2004 | Gu et al. | 370/229 |
| 2004/0199659 A1 * | 10/2004 | Ishikawa et al. | 709/235 |
| 2005/0002400 A1 | 1/2005 | Karol et al. | |
| 2005/0033839 A1 * | 2/2005 | Nisani et al. | 709/224 |
| 2005/0033840 A1 * | 2/2005 | Nisani et al. | 709/224 |
| 2005/0198252 A1 * | 9/2005 | Nisani et al. | 709/223 |
| 2006/0059253 A1 * | 3/2006 | Goodman et al. | 709/223 |
| 2007/0025248 A1 * | 2/2007 | Freytsis et al. | 370/230 |
| 2007/0242670 A1 * | 10/2007 | Simonson et al. | 370/390 |
| 2007/0268836 A1 * | 11/2007 | Byun et al. | 370/252 |
| 2008/0049634 A1 * | 2/2008 | Goyal et al. | 370/252 |
| 2008/0049641 A1 * | 2/2008 | Edwards et al. | 370/253 |
| 2008/0052394 A1 * | 2/2008 | Bugenhagen et al. | 709/224 |
| 2009/0034426 A1 * | 2/2009 | Luft et al. | 370/252 |
| 2009/0238085 A1 * | 9/2009 | Khanduri | 370/252 |

OTHER PUBLICATIONS

Schulzrinne et al., "RTP: A Transport Protocol for Real-Time Applications", RFC 3550, Jul. 2003, 89 pgs.
Schulzrinne et al., "RTP: A Transport Protocol for Real-Time Applications", RFC 1889, Jan. 1996, 75 pgs.
Friedman et al., "RTP Control Protocol Extended Reports (RTCP XR)", Nov. 2003, 55 pgs.

* cited by examiner

*Primary Examiner*—Chi H. Pham
*Assistant Examiner*—Kevin Mew
(74) *Attorney, Agent, or Firm*—Stolwitz Ford Cowger LLP

(57) ABSTRACT

A device and method provides a means for monitoring a media segment of a Real-time Transport Protocol (RTP) media stream without interfering with end-to-end monitoring of the RTP media stream. The device includes a media segment monitor to generate segment control messages associated with a selected segment of the RTP media stream transmitted between a source endpoint and a destination endpoint in a packet network. The device further includes an interface to transmit and receive the segment control messages; and a processor to process the segment control messages, the segment control messages including call quality metrics related to the selected segment of the RTP media stream.

30 Claims, 3 Drawing Sheets

MEDIA SEGMENT MONITORING

BACKGROUND OF THE INVENTION

1. Field of the Invention

The invention relates generally to network monitoring and, more particularly, to a device and method for monitoring a network at selected media segments.

2. Description of the Related Art

Real-time Transport Protocol (RTP), defined in Request for Comments (RFC) 3550, is widely used for the transmission of real-time or near-real-time data over packet networks. A Voice over Internet Protocol (VoIP) network may consist of one or more Internet Telephony Administrative Domains (ITADs), which include network components served by the same set of call route servers. An ITAD may be further broken down into geographic Points of Presence (POP), with each POP containing some number of gateways. Thus, an RTP media stream of a VoIP call may traverse multiple gateways to bridge up its calling and called parties.

RTP Control Protocol (RTCP) is a sister protocol of the RTP and provides out-of-band control information for an RTP media stream. A primary function of RTCP is to provide feedback on the quality of service (QoS) being provided by RTP. RTCP is used to monitor the media connection, collect statistics and information such as bytes sent, packets sent, lost packets, jitter, feedback and round trip delay, and periodically transmit control packets to participants in a streaming multimedia session (i.e., in the forward transmission direction) or as a feedback from a receiver back to a sender.

To ensure that IP networks meet customer expectations, service providers define Service Level Agreements and manage their networks to meet SLA requirements. Typically, performance measurements are taken from end-to-end (from the customer premise location). RTCP has been the prevailing approach to monitor its associated RTP stream for various voice metrics such as packet loss, inter-arrival jitter, round trip delay, etc. These voice metrics can be used at the endpoints (e.g., IP phones and originating/terminating voice gateways) of an RTP stream to judge the QoS or conformance check against an SLA from the perspective of these endpoints.

In general, a VoIP network may be composed of VoIP nodes bearing different ownership. Well-known VoIP nodes types include voice gateways, IP-to-IP gateways, and session border controllers (SBC). In a typical scenario, a backhaul VoIP service provider (VSP) sits between customer VoIP customer premise equipment (CPE) to bridge VoIP calls from one customer VoIP network to another. Thus, in many cases, a VSP does not control an entire call connection or session. Further, the backhaul VSP may either not have visibility to or may not be interested in looking into any VoIP node belonging to a customer's VoIP network.

Since there is no understanding of how each segment of a media path connecting the endpoints is performing with respect to voice quality, the existing end-to-end per call voice metric does not necessarily favor a VSP for justifying how well an SLA is being followed or locating a particular portion of media path that may be suffering a QoS issue.

Thus, there is a need to providing a fuller or more detailed picture of the media path QoS at a granular level while continuing to provide an end-to-end view of network performance.

SUMMARY OF THE INVENTION

One aspect of the invention is a method for monitoring a media segment of a network. The method includes transmitting a Real-time Transport Protocol (RTP) media stream from a source endpoint to a destination endpoint in the packet network; monitoring a selected segment of the RTP media stream between the source endpoint and the destination endpoint, wherein monitoring the selected segment does not interfere with monitoring the RTP media stream from the source endpoint to the destination endpoint; and transmitting and receiving control messages associated with the selected RTP media stream segment, the control messages including a set of call quality metrics.

Another aspect of the invention is a device that includes a media segment monitor to generate segment control messages associated with a selected segment of a Real-time Transport Protocol (RTP) media stream transmitted between a source endpoint and a destination endpoint in a packet network. The device further includes an interface to transmit and receive the segment control messages; and a processor to process the segment control messages, the segment control messages including call quality metrics related to the selected segment of the RTP media stream.

BRIEF DESCRIPTION OF THE DRAWINGS

The above and other features and advantages of embodiments of the invention will become readily apparent by reference to the following detailed description when considered in conjunction with the accompanying drawings.

DETAILED DESCRIPTION OF THE EMBODIMENTS

As will be apparent to those skilled in the art from the following disclosure, the invention as described herein may be embodied in many different forms and should not be construed as limited to the specific embodiments set forth herein. Rather, these embodiments are provided so that this disclosure will fully convey the principles of the invention to those skilled in the art.

Figure 1:
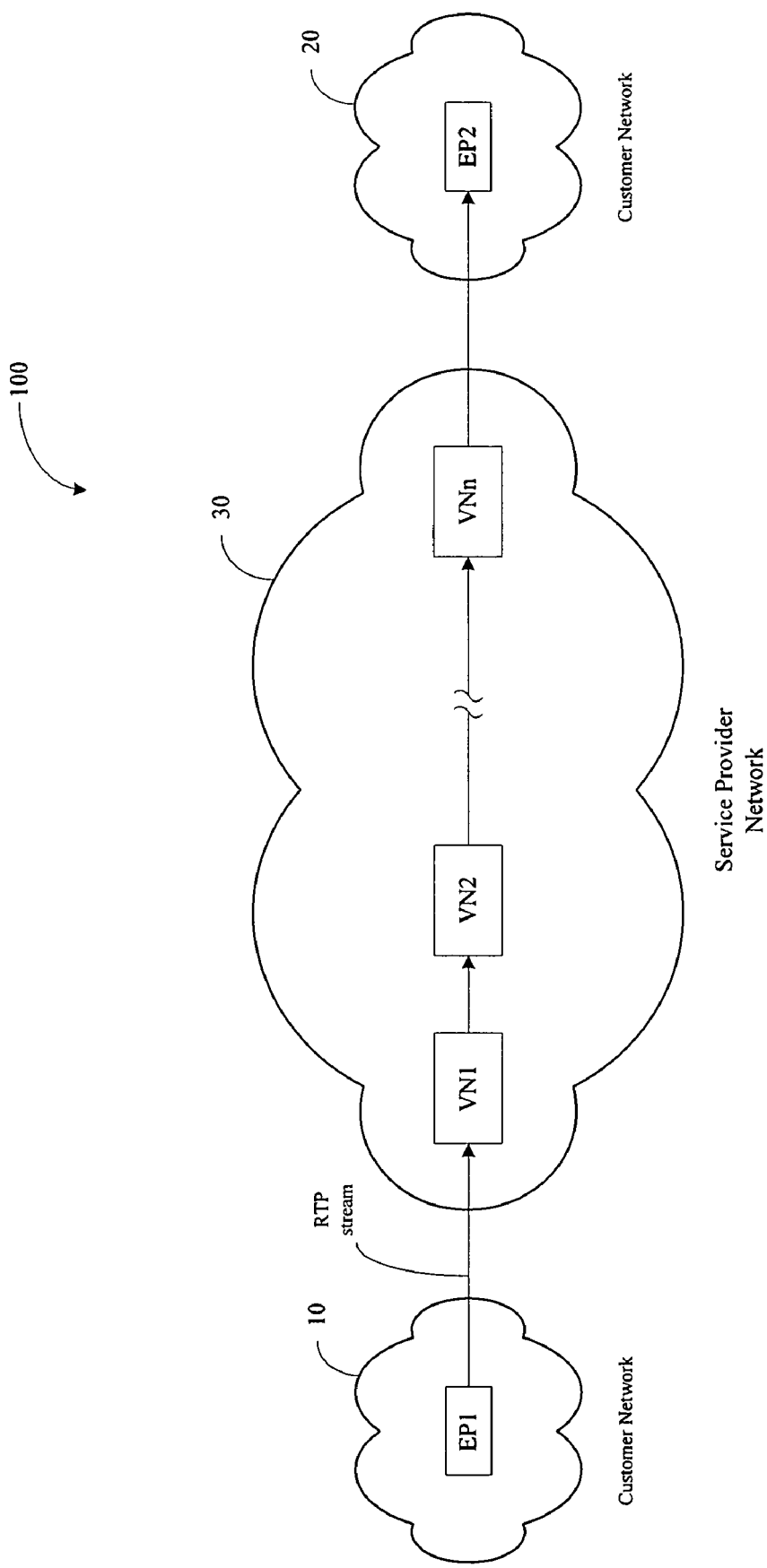
FIG. 1 is a diagram of a Voice over Internet Protocol (VoIP) network in which embodiments of the invention may be implemented.

FIG. 1 shows a diagram of a VoIP network 100 wherein embodiments of the invention may be implemented. An RTP media stream may be initiated from an endpoint 1 (EP1) located in a customer network 10 toward an endpoint 2 (EP2) located in a customer network 20 through VoIP nodes VN1-VNn located in a service provider network 30. An end-to-end RTCP session may exist between EP1 and EP2, depending on whether both endpoints are capable of doing RTCP or not. A second control packet mechanism may be initiated to monitor a selected network segment (between selected VoIP nodes) without interfering with an RTCP session, if it exists. In the embodiment described herein, the second control packet mechanism may be another RTCP session (a "sub-RTCP" or a "segment RTCP" session) at each media segment on the associated RTP media path. However, the second control packet mechanism need not necessarily use the RTCP packet format.

In RTCP, a packet format packet type (PT) field includes a number which identifies the type of packet. RTCP packet types include, for example, Sender Report (SR), Receiver Report (RR), and Source Description (SDES). Values of 200-208 are already allocated and registered with Internet Assigned Numbers Authority (IANA), the organization that oversees IP address allocation and other Internet protocol assignments. A new RTCP message type, for example, 209, may be defined to identify a sub-RTCP session. The suggested type of packet does not fall under any of the types already defined in RFC 3550 and may be registered with IANA to avoid potential conflict in the future.

Figure 2:
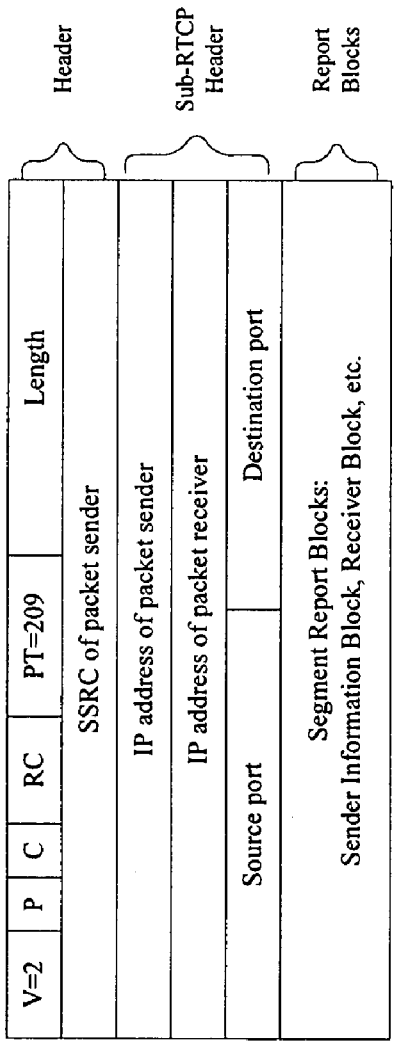
FIG. 2 shows a packet format for a sub-RTCP message, according to one embodiment of the invention.

The Sub-RTCP message may be formatted as shown in FIG. 2. The sub-RTCP message preferably contains a common RTCP message header plus an optional sub-RTCP header followed by one or more report blocks such as SR, RR, and SDES. These reports contain statistics such as the number of packets sent, number of packets lost, and inter-arrival jitter. The sub-RTCP header in FIG. 2 is preferably a fixed-length section whose existence may be controlled by a C bit, where 1—existing, 0—not present. In the body of the sub-RTCP message, SR, RR, and other RTCP report blocks are preferably wrapped and carried between VNi and VNi+1.

Figure 3:
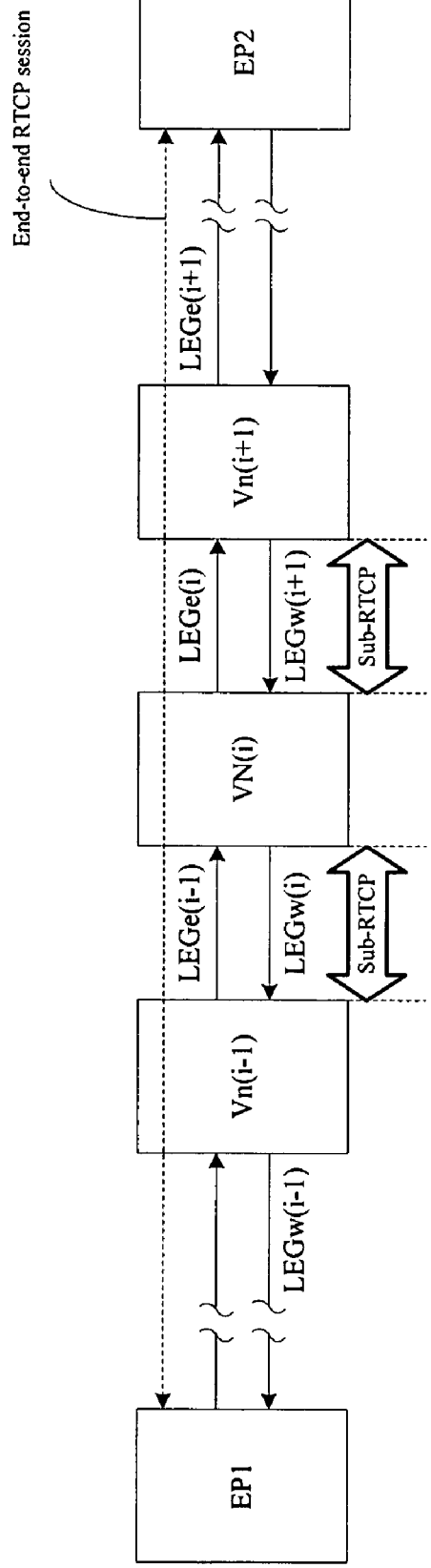
FIG. 3 illustrates an end-to-end RTCP session and two sub-RTCP sessions at a VoIP node in the VoIP network of FIG. 1.

Referring now to FIG. 3, an RTP media stream may be functionally broken into two legs at a media VoIP node, for example, LEGw and LEGe. When a call's signaling also traverses the same VoIP node, the call signaling logic may be combined into the LEGw and LEGe. As shown in FIG. 3, LEGe(i) and LEGw(i) may be the two media stream legs for the RTP stream on VNi, and LEGe(i+1) and LEGw(i+1) may be the media legs for the RTP stream on VNi+1.

Figure 5:
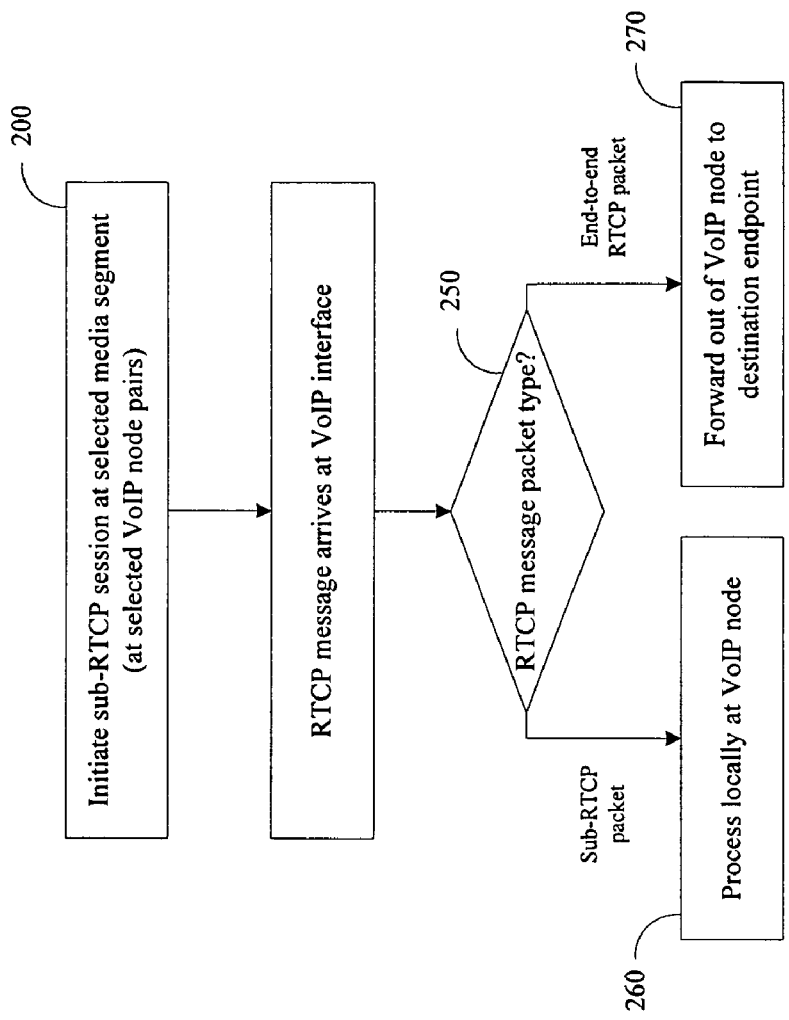
FIG. 5 is a flowchart illustrating a sub-RTCP session.
Figure 4:
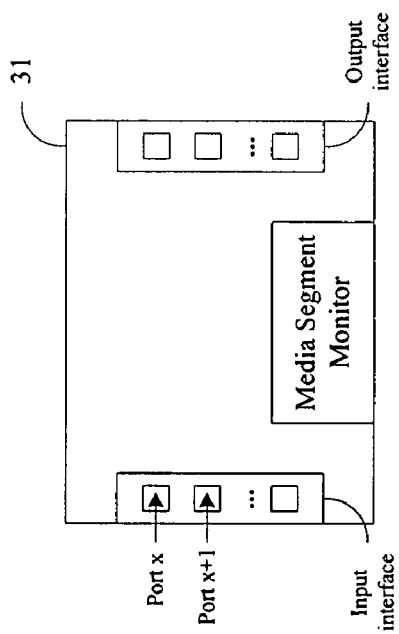
FIG. 4 is a block diagram of a VoIP node that performs media segment monitoring.

Refer now to FIGS. 3, 4, and 5. In block 200, a media segment monitoring session, such as a sub-RTCP session, for an RTP stream traversing VNi and VNi+1 can be established between any two selected VoIP node pairs, for example, VNi and VNi+1. Thus, one RTP media presence on a VoIP node can form two segment sub-RTCP sessions toward its east and west peer VoIP nodes, respectively. For example, VNi can have two sub-RTCP sessions: a sub-RTCP session may exist between two peer RTP legs on VNi and VNi+1, e.g. between LEGe(i) and LEGw(i+1); and one sub-RTCP session may exist between two peer RTP legs on VNi and VNi−1, e.g., between LEGe(i−1) and LEGw(i). In other embodiments, the sub-RTCP session can also be established between nodes which are not necessarily adjacent nodes; for example, between VNi and VNi+2.

When an RTCP message arrives at an interface at a VoIP node 31, for example at LEGe(i) on VNi, in block 250, the interface preferably looks into the RTCP message type to decide if the message needs to be forwarded out to its next-hop VoIP node or just digested locally on VNi. In block 260, if the RTCP message is identified as a sub-RTCP packet, for example, message type 209 for a sub-RTCP session, the sub-RTCP message will be intercepted and processed accordingly to generate the media statistics for its corresponding media segment, for example, between VNi and VNi+1. If the interface does not recognize the message type, i.e., the VoIP node is not RTCP capable, then RTCP message is discarded. Otherwise, in block 270, all other RTCP messages may be forwarded out to the destination endpoint.

Through a sub-RTCP session, all of the defined media statistics specified in RFC 3550 such as packet loss, fraction loss, inter-arrival jitter, round trip time, and other statistics defined in RFC 3611, RTP Control Protocol Extended Reports (RTCP XR), as well as RTCP XR-HR (defined in IETF draft) may be generated. Alternatively, other media statistics may be monitored and need not be limited to those typically collected using RTCP.

The sub-RTCP session does not depend on an endpoint's RTCP capability or whether an RTCP session is established. However, if the endpoints are capable of establishing RTCP sessions, a sub-RTCP session may be tunneled through an existing end-to-end RTCP session. Thus, no extra RTP/RTCP ports are required.

RTP and RTCP share a relationship. RTP may be assigned to a port x, and RTCP may be assigned to a port x+1 at the VoIP interface. To calculate delay accurately, for example, it is important that RTCP packets follow the associated RTP packets on the same path. In one embodiment, a sub-RTCP session may also be assigned to the same port x+1 as the RTCP session. Thus, when an end-to-end RTCP session is established and a sub-RTCP session is also established to monitor a media segment between Vn and Vn+1, the end-to-end RTCP packets and the sub-RTCP packets share the channel at the media segment between Vn and Vn+1. However, at any given time, only one of the end-to-end RTCP packets and the sub-RTCP packets can use port x+1. A switch preferably provides for a means for selecting which of the end-to-end RTCP or sub-RTCP has priority to use port x+1. In one embodiment, the end-to-end RTCP packets may be given priority. In another embodiment, the sub-RTCP packets may have priority instead.

Alternatively, a segment RTCP session between two peer VoIP nodes can be established for collecting the inter-VoIP node segment statistics. In this embodiment, the end-to-end RTCP messages may be relayed through the segment RTCP session to its next hop until its endpoint destination is reached. Similarly, a message type value may be used to indicate a segment RTCP message to relay the end-to-end RTCP messages. A packet type value for relaying RTCP messages may be registered with IANA.

Having described exemplary embodiments of the invention, it should be apparent that modifications and variations can be made by persons skilled in the art in light of the above teachings. Therefore, it is to be understood that changes may be made to embodiments of the invention disclosed that are nevertheless still within the scope and the spirit of the claims.

The invention claimed is:
1. A method, comprising:
  transmitting a Real-time Transport Protocol (RTP) media stream from a source endpoint to a destination endpoint in a packet network;
  monitoring a selected segment of the RTP media stream between and excluding the source endpoint and the destination endpoint, wherein monitoring the selected segment does not interfere with monitoring the RTP media stream from the source endpoint to the destination endpoint;
  transmitting and receiving control messages associated with the selected RTP media stream segment, the control messages including a set of call quality metrics;
  transmitting and receiving an end-to-end Real-time Transport Control Protocol (RTCP) control message, the end-to-end RTCP control message including a set of call quality metrics related to the RTP media stream from the source endpoint to the destination endpoint;
  receiving a control message associated with the transmitted RTP media stream at a network node located between the source endpoint and the destination endpoint;
  identifying the received control message according to a packet type identifier;
  processing the received control message at the network node if the control message is associated with the selected RTP stream segment; and forwarding the received control message out of the network node if the control message is associated with the end-to-end RTCP control message.

2. The method of claim 1, wherein the selected RTP media stream segment corresponds to a selected network node pair located between, and excluding, the source endpoint and the destination endpoint in the packet network.

3. The method of claim 2, wherein the selected network node pair corresponds to adjacent network nodes.

4. The method of claim 1, wherein the set of call quality metrics includes delay, jitter, and packet loss.

5. A device, comprising:
a media segment monitor configured to generate segment control messages associated with a selected segment of a Real-time Transport Protocol (RTP) media stream transmitted between a source endpoint and a destination endpoint in a packet network, wherein the selected segment corresponds to a network node pair located between, and excluding, the source endpoint and the destination endpoint in the packet network;
an interface configured to transmit and receive control messages including the segment control messages, wherein the interface is further configured to identify a designation of the control messages received; and
a processor configured to process the control messages that are designated as the segment control messages, wherein the segment control messages comprise call quality metrics related to the selected segment of the RTP media stream, and wherein the control messages that are designated as end-to-end Real-time Transport Control Protocol (RTCP) control messages are forwarded to the destination endpoint.

6. The device of claim 5, wherein the interface further transmits and receives the end-to-end RTCP control messages, and wherein the end-to-end RTCP control messages comprise a set of call quality metrics related to the RTP media stream from the source endpoint to the destination endpoint.

7. The device of claim 5, wherein the control messages are designated according to a packet type identifier.

8. The device of claim 7, wherein the end-to-end RTCP control messages are forwarded from the network node pair to the destination endpoint.

9. The device of claim 5, wherein the interface comprises a plurality of ports to transmit and receive packets.

10. The device of claim 9, wherein the segment control messages and the end-to-end RTCP control messages share a port.

11. The device of claim 10, further comprising:
a switch configured to select which of the control messages has priority to use the shared port.

12. A device, comprising:
means for generating segment control messages associated with a selected segment of a Real-time Transport Protocol (RTP) media stream transmitted between a source endpoint and a destination endpoint in a packet network, the selected segment corresponding to a network node pair located between and excluding the source endpoint and the destination endpoint in the packet network;
means for identifying control messages received by the device as the segment control messages or as end-to-end Real-time Transport Control Protocol (RTCP) control messages; and
means for processing the control messages that are associated with the selected segment of the RTP media stream, wherein the segment control messages comprise call quality metrics related to the selected segment of the RTP media stream, and wherein the end-to-end RTCP control messages are forwarded to the destination endpoint.

13. The device of claim 12, wherein the control messages are identified by a packet type identifier of the control messages, and wherein the end-to-end RTCP control messages comprise a set of call quality metrics related to the RTP media stream from the source endpoint to the destination endpoint.

14. The device of claim 13, wherein the end-to-end RTCP control messages are identified according to the packet type identifier.

15. The device of claim 13, further comprising:
means for forwarding the end-to-end RTCP control messages from the network node pair to the destination endpoint.

16. The device of claim 14, further comprising:
means for prioritizing transmission of the end-to-end RTCP control messages according to the packet type identifier.

17. An article of non-transitory computer-readable medium containing instructions that, when executed by a system, cause the system to perform operations comprising:
generating segment control messages associated with a selected segment of a Real-time Transport Protocol (RTP) media stream transmitted between a source endpoint and a destination endpoint in a packet network, wherein the selected segment corresponds to a network node pair located between, and excluding, the source endpoint and the destination endpoint in the packet network;
designating control messages received by one or more nodes of the network node pair as the segment control messages or as end-to-end Real-time Transport Control Protocol (RTCP) control messages;
processing the control messages designated as segment control messages, wherein the segment control messages comprise call quality metrics related to the selected segment of the RTP media stream;
forwarding the control messages designated as the end-to-end RTCP control messages from the one or more nodes.

18. The article of claim 17, wherein the end-to-end RTCP control messages comprise a set of call quality metrics related to the RTP media stream from the source endpoint to the destination endpoint.

19. The article of claim 17, wherein the operations further comprise:
identifying the end-to-end RTCP control messages according to a packet type identifier of the control messages.

20. The article of claim 17, wherein the end-to-end RTCP control messages are forwarded to the destination endpoint, and wherein the segment control messages are consumed at the one or more nodes of the network node pair.

21. The article of claim 19, wherein the operations further comprise:
prioritizing transmission of the control messages received according to the packet type identifier.

22. A system, comprising:
a plurality of network nodes configured to transmit a Real-time Transport Protocol (RTP) media stream from a source endpoint to a destination endpoint in a packet network; and
a media segment monitor configured to monitor a selected segment of the RTP media stream between the source endpoint and the destination endpoint, wherein the selected segment corresponds to a pair of network nodes located between, and excluding, the source endpoint and the destination endpoint in the packet network, wherein the media segment monitor is configured to process a received control message when the control message is associated with the selected RTP stream segment, and wherein the media segment monitor is configured to forward the received control message to the destination endpoint when the control message is associated with an end-to-end Real-time Transport Control Protocol (RTCP) control message.

23. The system of claim 22, wherein the media segment monitor is further configured to transmit and receive control messages associated with the selected RTP media stream segment, and wherein the RTP control messages comprise a set of call quality metrics.

24. The system of claim 22, wherein the media segment monitor is further configured to transmit and receive control messages associated with the end-to-end RTCP control message, and wherein the end-to-end RTCP control message comprises a set of call quality metrics related to the RTP media stream from the source endpoint to the destination endpoint.

25. The system of claim 22, wherein the media segment monitor is further configured to identify the received control message according to a packet type identifier.

26. The system of claim 23, wherein the RTP control messages are tunneled through an existing end-to-end RTCP session.

27. The system of claim 26, further comprising an interface configured to transmit and receive the RTP control messages, wherein the RTP control messages and the end-to-end RTCP control message are assigned to one port of the interface.

28. The device of claim 5, wherein the interface comprises a first port and a second port, wherein the segment control messages are assigned to the first port, and wherein the end-to-end RTCP control messages are assigned to the second port.

29. The device of claim 12, wherein the network node pair comprises a first node and a second node, wherein a first segment control message is transmitted from the first node to the second node, and wherein a second segment control message is transmitted from the second node to the first node.

30. The article of claim 17, wherein the end-to-end RTCP control messages are relayed through the selected segment to a next hop in the packet network prior to reaching the destination endpoint.

* * * * *

UNITED STATES PATENT AND TRADEMARK OFFICE
CERTIFICATE OF CORRECTION

| | | |
|---|---|---|
| PATENT NO. | : 7,796,532 B2 | Page 1 of 1 |
| APPLICATION NO. | : 11/444652 | |
| DATED | : September 14, 2010 | |
| INVENTOR(S) | : Kevin Joseph Connor | |

It is certified that error appears in the above-identified patent and that said Letters Patent is hereby corrected as shown below:

On the Title page, reference (74), ATTORNEY, AGENT, OR FIRM, delete "Stolwitz" and insert -- Stolowitz --.

On column 6, line 38, CLAIM 17, after "stream;" insert -- and --.

Signed and Sealed this
Twenty-fourth Day of April, 2012

David J. Kappos
*Director of the United States Patent and Trademark Office*